US012624477B2

(12) United States Patent (10) Patent No.: US 12,624,477 B2
Hedlund (45) Date of Patent: May 12, 2026

(54) METHOD FOR PROVIDING A FILTERED SPINNING DOPE

(71) Applicant: TREETOTEXTILE AB, Stockholm (SE)

(72) Inventor: Artur Hedlund, Gothenburg (SE)

(73) Assignee: TREETOTEXTILE AB, Stockholm (SE)

( * ) Notice: Subject to any disclaimer, the term of this patent is extended or adjusted under 35 U.S.C. 154(b) by 132 days.

(21) Appl. No.: 18/575,984

(22) PCT Filed: Jul. 8, 2022

(86) PCT No.: PCT/EP2022/069071
§ 371 (c)(1),
(2) Date: Jan. 2, 2024

(87) PCT Pub. No.: WO2023/281058
PCT Pub. Date: Jan. 12, 2023

(65) Prior Publication Data
US 2024/0309559 A1 Sep. 19, 2024

(30) Foreign Application Priority Data

Jul. 8, 2021 (EP) ..................................... 21184429

(51) Int. Cl.
 *B01D 21/26* (2006.01)
 *B01D 37/00* (2006.01)
 (Continued)

(52) U.S. Cl.
 CPC ............. *D01F 2/02* (2013.01); *B01D 21/262* (2013.01); *C08B 1/003* (2013.01); *D01D 1/065* (2013.01);
 (Continued)

(58) Field of Classification Search
 CPC ...... B01D 21/26; B01D 21/262; B01D 37/00; C08B 1/003; C08L 1/00; D01D 1/02;
 (Continued)

(56) References Cited

U.S. PATENT DOCUMENTS 3,393,262 A 7/1968 Durso et al.
4,018,681 A * 4/1977 LaPolla ................... C08B 11/22
                                                                        210/695

(Continued)

FOREIGN PATENT DOCUMENTS

CL 202002312 12/2020
CN 105369394 A 3/2016
 (Continued)

OTHER PUBLICATIONS

European Search Report for Application No. EP21184429 dated Dec. 14, 2021.
 (Continued)

*Primary Examiner* — Leo B Tentoni
(74) *Attorney, Agent, or Firm* — MOSER TABOADA

(57) ABSTRACT

The present invention describes a method of dissolving cellulose, said method comprising: dissolving cellulose in an alkali solution: —filtering the dissolved cellulose, thereby forming a filtered dissolved cellulose solution and a filter reject; —mixing said filter reject having a first viscosity value with a dissolution liquid having a second viscosity value, wherein the second viscosity value is lower than the first viscosity value, to provide a diluted reject stream having a third viscosity value being lower than the first viscosity value of the filter reject; and—separating inhomogeneities from the diluted reject stream.

20 Claims, 7 Drawing Sheets

(51) Int. Cl.

| | |
|---|---|
| *C08B 1/00* | (2006.01) |
| *C08L 1/00* | (2006.01) |
| *D01D 1/02* | (2006.01) |
| *D01D 1/06* | (2006.01) |
| *D01D 1/09* | (2006.01) |
| *D01D 1/10* | (2006.01) |
| *D01D 5/06* | (2006.01) |
| *D01D 5/12* | (2006.01) |
| *D01D 7/00* | (2006.01) |
| *D01D 10/06* | (2006.01) |
| *D01F 2/00* | (2006.01) |
| *D01F 2/02* | (2006.01) |

(52) U.S. Cl.
CPC .............. *D01D 1/09* (2013.01); *D01D 1/106* (2013.01); *D01D 5/06* (2013.01); *D10B 2201/20* (2013.01)

(58) Field of Classification Search
CPC   D01D 1/10; D01D 1/106; D01D 5/06; D01D 5/12; D01D 7/00; D01D 10/06; D01F 2/00; D01F 2/02; D10B 2201/20
USPC  ... 264/169, 187, 210.8, 211.14, 211.15, 233; 210/767, 781, 787; 106/163.01
See application file for complete search history.

(56) References Cited

U.S. PATENT DOCUMENTS

| | | | | |
|---|---|---|---|---|
| 2008/0275231 | A1 | 11/2008 | Zhang et al. | |
| 2015/0122442 | A1* | 5/2015 | Caldeman | D21H 11/14 |
| | | | | 162/202 |
| 2020/0079925 | A1* | 3/2020 | Haslinger | C08B 1/003 |
| 2021/0269969 | A1* | 9/2021 | Brelid | B29B 17/0412 |

FOREIGN PATENT DOCUMENTS

| | | | |
|---|---|---|---|
| EP | 3521248 | A1 | 6/2014 |
| WO | WO-2013124265 | A1 | 8/2013 |
| WO | WO-2017/178531 | A1 | 10/2017 |
| WO | WO-2017178532 | A1 | 10/2017 |
| WO | WO-2020/171767 | A1 | 8/2020 |

OTHER PUBLICATIONS

International Search Report for Application No. PCT/EP2022/069071 dated Nov. 21, 2022.

* cited by examiner

| | Reject stock solution | Reference dissolution | Reject solution 1 (5%) | Reject solution 2 (10%) | Reject solution 3 (23%) |
|---|---|---|---|---|---|
| Hydrolyzed Buckeye #5 (IV=289 mL/g | 6,50 | - | 0,28 | 0,54 | 1,25 |
| Enocell (IV=210 mL/g | - | 6,00 | 6,12 | 5,86 | 5,15 |
| NaOH | 7,35 | 7,50 | 7,65 | 7,50 | 7,50 |
| ZnO | 0,93 | 0,95 | 0,97 | 0,95 | 0,95 |
| H2O | 85,21 | 85,55 | 84,98 | 85,15 | 85,15 |
| Total cellulose | 6,50 | 6,00 | 6,40 | 6,40 | 6,40 |
| Clogging value | 4500 | 900 | 769 | 1005 | 1185 |

Earlier reference clogging values 766, 770, 748, 760, 758, 787 = average 765

METHOD FOR PROVIDING A FILTERED SPINNING DOPE

FIELD OF THE INVENTION

The present invention relates to a method for dissolving cellulose, e.g. as a complement to or in a spinning dope preparation process.

TECHNICAL BACKGROUND

Different forms of spinning dope production methods are known and have been described before. One such related process is described in WO2017/178531. In WO2017/178531 there is disclosed a method for the production of a spinning dope composition, which method comprises a homogenization involving vigorous mixing of a cellulosic pulp material in alkali solution and thereafter a dissolution involving mixing of the cellulosic pulp material in the alkali solution to obtain a spinning dope composition, wherein the cellulosic pulp material in alkali solution is kept at a temperature of less than 0° C. during the homogenization and during at least part of the dissolution.

Spinning dope preparation process, such as the one disclosed above, includes a filtration step. One aim of the present invention is to provide a process resulting in an improved spinning dope filtration, and which process is intended as a complement to a spinning dope preparation process.

SUMMARY OF THE INVENTION

The stated purpose above is achieved by a method of dissolving cellulose, said method comprising:

dissolving cellulose in an alkali solution;

filtering the dissolved cellulose, thereby forming a filtered dissolved cellulose solution and a filter reject; and mixing said filter reject having a first viscosity value with a dissolution liquid having a second viscosity value, wherein the second viscosity value is lower than the first viscosity value, to provide a diluted reject stream having a third viscosity value being lower than the first viscosity value of the filter reject; and separating inhomogeneities from the diluted reject stream.

As should be understood from the above, the method according to the present invention is directed to the reuse of a filter reject by the removal of inhomogeneities from the filter reject. In this context it should be mentioned that the filter reject also is a cellulose solution with a high concentration of inhomogeneities, and that the reuse implies a potential to reuse the solution part of the filter reject.

According to one embodiment of the present invention, the method is implemented in or connected to a spinning dope preparation process. A filter reject being recovered in spinning dope preparations using cellulose in alkali contains particles and other insoluble solids, which are difficult to remove. The present invention is directed to a method enabling removal of this material being at least partly insoluble, or at least has not undergone optimal dissolution, in an efficient way so that the valuable content of the filter reject, i.e. the liquid fraction, then may be recovered and used in a subsequent step or steps in the cellulose dissolution, such as in a spinning dope preparation process.

According to one embodiment, the method according to the present invention comprises the following steps:

dissolving cellulose in an aqueous alkali dissolution liquid, to generate an alkaline cellulose solution, in which more than 97, preferably more than 99%, of the added cellulose has been dissolved;

filtering the alkaline cellulose solution, thereby generating two fractions: a major fraction of filtered alkaline cellulose solution free of any particles larger than the filter-cut-off value, and a second minor reject fraction of alkaline cellulose solution which contains the particles captured by the filter;

mixing said reject fraction having a first viscosity value, with another aqueous alkali dissolution liquid, preferably with the same or very similar composition to the above first mentioned aqueous alkali dissolution liquid, which has a second viscosity value being lower than the first viscosity value of the aqueous alkali dissolution liquid, to provide a diluted reject fraction which has a third viscosity value being lower than the first viscosity value.

Furthermore, with reference to the above it may be mentioned that the expression "dissolution liquid" refers to a liquid that is a solvent which can be used to provide new solution and which as such lowers the viscosity of the obtained mixture when being mixed with the filter reject. In other words, when the filter reject, which is a polymer solution, is admixed with the dissolution liquid, the obtained viscosity is lowered, because the polymer concentration is reduced by dilution.

As a reference to further prior art documents, in WO2013/124265 there is disclosed a method for regeneration of a cellulose containing material comprising exposing the cellulose containing material to oxygen with an alkali aqueous solution at a pH of at least 9 and at a temperature of at least 20° C., dispersing the cellulose containing material in the alkali aqueous solution, adding an organic solvent to the dispersion to precipitate cellulose and separating the precipitated cellulose by filtering or centrifugation. There are several key differences between the method according to the present invention and the method disclosed in WO2013/124265. First of all, the present invention is directed to the processing of a filter reject in a smart way to diminish filtering problems and removal of inhomogeneities and at the same time to enable recovery and possible reuse of the solution part of the filter reject. This is not intended or hinted in any way in WO2013/124265. In WO2013/124265, however, the main product and cellulose is intended to be precipitated and not kept in the solution, which is the case according to the present invention. Furthermore, the dilution of the filter reject such as performed according to the present invention is not disclosed or intended to be performed in the method according to WO2013/124265. Moreover, in the step of dissolving cellulose in an alkali solution performed by the present invention, the solubility of cellulose may typically be at least 97%, more preferably at least 99%. This may be compared with the method disclosed in WO2013/124265, where only 80% solubility is provided. This also implies that the method according to the present invention typically provides less than maximum 3%, preferably less than maximum 1%, undissolved material, which may be compared to 20% in the method according to WO2013/124265. Yet other differences will become clear from the description below.

As will be notable from the description provided below, the method according to the present invention finds use in different spinning dope preparation processes. Below, there are provided certain embodiments linked to a suitable implementation of the method according to the present invention into a spinning dope preparation process. This also implies that the filtered cellulose solution is intended to be used as a spinning dope for fiber spinning, for which the requirements on purity from particulates are very demanding.

EMBODIMENTS OF THE INVENTION

Figure 1:
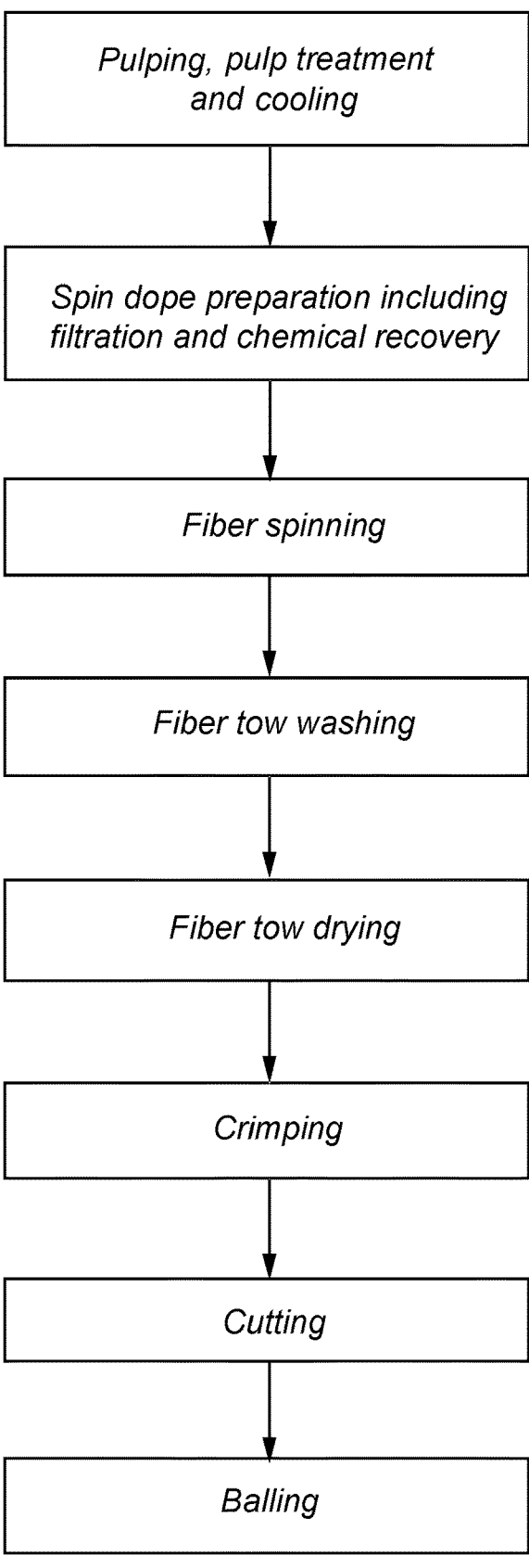
In FIG. 1 there is shown a fiber production process, from pulp to an end fiber product.

Below there is provided several embodiments according to the present invention, and a description thereto.

According to one embodiment, the alkali solution is a first alkali dissolution liquid, and wherein the dissolution liquid is a second alkali dissolution liquid. The first alkali dissolution liquid acts as a solvent so that at least 95%, preferably at least 97%, more preferably at least 99% of the cellulose is solved therein. In line with this, according to one embodiment, the solubility of the cellulose in the solution formed by the alkali solution, preferably being a first alkali dissolution liquid, is kept at at least 95%, preferably at least 97%, more preferably at least 99%. Furthermore, according to yet another embodiment the cellulose concentration in the solution formed by the alkali solution, preferably being a first alkali dissolution liquid, after dissolving the cellulose therein is at least 4 wt. %, preferably in a range of 4-12 wt. %, preferably 5-10 wt. %, calculated on the total weight.

The second alkali dissolution liquid acts as a solvent, may be similar to the first alkali dissolution liquid, typically with a low level of cellulose, such as below 0.1% cellulose. Also the alkali solution, preferably being a first dissolution liquid, preferably has a low content of cellulose before cellulose is dissolved therein.

In relation to the above, and in the context of the present invention, the dissolution liquids are alkali solutions intended as solvents, which should not be confused with the solutions comprising higher levels of cellulose, such as at least 4% cellulose, i.e. after cellulose has been dissolved therein.

In line with the above, according to one embodiment, the dissolution liquid is an alkaline aqueous solvent solution, preferably an aqueous sodium hydroxide solution, more preferably the alkali solution is a first alkali dissolution liquid and the dissolution liquid is a second alkali dissolution liquid.

Alkaline spinning dope systems are used in many processes, such as for the production of fibers or films. Moreover, such produced cellulose based fibers or films are used in many different applications.

Furthermore, with reference to the above important aspect of removing inhomogeneities, such inhomogeneities may comprise different forms. In line with this, according to one embodiment, the inhomogeneities comprise any of particles, aggregates, solid components, or impurities, and/or other insoluble material. Combinations of the different forms may also constitute the inhomogeneities in the filter reject and thus to be removed from the diluted reject stream. As a standard, inhomogeneities are such particles, aggregates, solid components, or impurities, and/or other insoluble material having a size of at least 1 µm, normally above 5 µm. Moreover, the inhomogeneities have a density differing from the dissolution liquid. Furthermore, normally they behave more as a solid than the surrounding solution, which primarily is a liquid, such as in terms of viscosity versus elasticity.

As should be understood from above, the method according to the present invention is directed to lowering the viscosity enabling for removal of the inhomogeneities mentioned above. According to one embodiment of the present invention, the second viscosity value of the dissolution liquid, preferably being a second alkali dissolution liquid, is at least 10 times lower, more preferably at least 20 times lower, more preferably at least 50 times lower, most preferably at least 100 times lower than the first viscosity value of the filter reject.

Furthermore, according to yet another embodiment, the third viscosity value of the diluted reject stream is at least 2 times lower, preferably at least 5 times lower, more preferably at least 10 times lower, more preferably at least 20 times lower, more preferably at least 50 times lower than the first viscosity value of the filter reject.

As hinted above and further discussed below, the present invention provides several advantages. One key advantage is to enable to use the dissolution liquid in an internal loop both to remove inhomogeneities from a filter reject and at the same time increase the total yield of cellulose and spinning dope. Furthermore, the present invention provides a high liberty of how much to filter off.

Moreover, the method according to the present invention enables to use different forms of starting cellulose materials. As an example, also cellulosic pulps with comparatively high levels of impurities are possible to use as it is possible to regulate the filtration degree and dissolution subsequent to filtration etc.

In line with the above, according to one embodiment of the present invention, the step of separating inhomogeneities from the diluted reject stream provides a stream of purified dissolution liquid with dissolved cellulose, which stream of purified dissolution liquid with dissolved cellulose is recycled to a step of dissolving cellulose, preferably a step of dissolving cellulose in an alkali solution, more preferably the stream of purified dissolution liquid with dissolved cellulose is recycled to said step of dissolving cellulose in an alkali solution from which step said filter reject was produced.

According to yet another embodiment, the step of separating inhomogeneities from the diluted reject stream provides a stream of purified dissolution liquid with dissolved cellulose which is used in a spin dope preparation step for dissolving cellulose, preferably recycled to a step of dissolving cellulose in an alkali solution, and/or to a step of mixing a filter reject having a first viscosity value with a dissolution liquid being an alkaline aqueous solvent solution.

As should be understood from above, the step of dissolving cellulose may be the first dissolving being performed as described in this process or may be in another parallel process, e.g. in a connecting dissolution step, such as e.g. in a spinning dope production process. Therefore, the step of dissolving cellulose may be performed in a parallel process but is preferably being performed in the same process as defined by the present invention, thus implying that internal recycling of dissolution liquid preferably is being utilized.

With reference to above it should be noted that although it is better to lower the viscosity as much as possible, this also implies that the liquid volume will increase proportionately thereto. Therefore, in accordance with the present invention there is need of a balance between these two aspects, that is lowering the viscosity enough without increasing the liquid volume too much. A large liquid volume will imply the need for a large flow capacity in terms of equipment, energy etc.

There are also other parameters of interest with reference to the method according to the present invention. One such parameter is temperature. In line with this, according to one embodiment, temperatures of the filter reject and the dissolution liquid are kept at temperatures below 30° C., preferably in a range of from 0° C. to 20° C., and/or wherein the diluted reject stream is kept at a temperature below 30° C., preferably in a range of from 0° C. to 20° C.

Another parameter is concentration, e.g. concentration of sodium hydroxide, but also of other components. According to one embodiment, the filter reject is an aqueous sodium hydroxide solution with a sodium hydroxide concentration of at least 5 wt. %, preferably 7-9 wt. %, more preferably 7.4-8 wt. %, and/or wherein the dissolution liquid is an aqueous sodium hydroxide solution with a sodium hydroxide concentration of at least 5 wt. %, such as in the range 5-20 wt. %, preferably at least 8 wt. %, more preferably in a range of 8-12 wt. %.

According to yet another embodiment, the filter reject is an aqueous sodium hydroxide solution with a sodium hydroxide concentration of at least 5 wt. %, preferably 7-9 wt. %, more preferably 7.5-8 wt. % and comprising cellulose in a concentration range 4-12 wt. %, preferably 5-10 wt. %, more preferably 6-8 wt. %, calculated on the total weight of the filter reject, and wherein the dissolution liquid, preferably being a second alkali dissolution liquid, is an aqueous sodium hydroxide solution with a sodium hydroxide concentration of at least 5 wt. %, preferably at least 8 wt. %, more preferably in a range of 8-12 wt. %. Here it should again be said that the alkali dissolution liquids typically do not comprise cellulose in any significant amounts, at least not the second alkali dissolution liquid.

According to another embodiment, the second viscosity value of the dissolution liquid, preferably being a second alkali dissolution liquid, is at least 10 times lower, more preferably at least 20 times lower, more preferably at least 50 times lower, most preferably at least 100 times lower than the first viscosity value of the filter reject, preferably wherein the third viscosity value of the diluted reject stream is at least 2 times lower, preferably at least 5 times lower, more preferably at least 10 times lower, more preferably at least 20 times lower, more preferably at least 50 times lower than the first viscosity value of the filter reject, and wherein the filter reject is an aqueous sodium hydroxide solution with a sodium hydroxide concentration of at least 5 wt. %, preferably 7-9 wt. %, more preferably 7.5-8 wt. % and comprising cellulose in a concentration range of 4-12 wt. %, preferably 5-10 wt. %, more preferably 6-8 wt. %, calculated on the total weight of the filter reject, and wherein the second alkali dissolution liquid is an aqueous sodium hydroxide solution with a sodium hydroxide concentration of at least 5 wt. %, preferably at least 8 wt. %, more preferably in a range of 8-12 wt. %.

With reference to above, the suitable level of the concentration of the sodium hydroxide of the filter reject depends on which type of cellulose pulp that is used as a starting material in the spinning dope preparation process. When derivatised cellulose pulp, such as viscose, is used, then the concentration is in the lower part of the range, and even down to 5 wt. %. For non-derivatised cellulose pulp, then a somewhat higher concentration of sodium hydroxide is preferred.

The present invention is of interest to implement in many processes, e.g. for the type of spinning dope preparation processes like the one disclosed in WO2017/178531.

It may also be mentioned that also the concentration of sodium hydroxide in the dissolution liquid suitably is at the same level or slightly above that in the filter reject. In general, it is suitable to provide a dissolution liquid with at least a somewhat higher sodium hydroxide concentration than in the filter reject to compensate for water being added during the dissolution, because water is present in the wet pulp.

As hinted above, the method according to the present invention involves dilution and decreasing the viscosity. In line with this, according to one embodiment of the present invention, the mixing of said filter reject with the dissolution liquid involves a total dilution of the filter reject by at least a factor 2, preferably at least a factor 3, with respect to the cellulose content. As one example, a factor in the range of 5-10 is possible. The suitable level also depends on the viscosities of the filter reject and dissolution liquid. In many cases, it is preferable to dilute the filter reject to a cellulose concentration at which the dissolved cellulose chains are no longer entangled and the dissolved cellulose chains occur as separate coils of one or a few polymer chains, without long-range interaction between cellulose chains, because the viscosity is the most sensitive to the cellulose concentration in the entangled range and less sensitive to concentration in the dilute, non-entangled, range. Furthermore, the dissolution may also be performed in several steps, which is further mentioned below.

Another perspective is absolute viscosity values. According to one embodiment of the present invention, the third viscosity value of the diluted reject stream is maximum 500 mPa*s, more preferably maximum 100 mPa*s, most preferably maximum 50 mPa*s, such as maximum 10 mPa*s.

As mentioned above, a dissolution liquid is more or less the same as the solvent in the filter reject stream. In line with this, according to one embodiment, the dissolution liquid has substantially the same composition with reference to main inorganic components of the filter reject, i.e. excluding the cellulosic fraction and water, but which dissolution liquid is concentrated relative to the water content by a factor ranging from 0.9-1.8. Not only salt components may be included in the consideration above, if additives are used, e.g. PEG, also these may be concentrated in a similar manner as the main salt components.

Moreover, as said above, the dilution may be performed in several steps. According to one embodiment, the dilution of the filter reject by mixing with dissolution liquid is performed in at least two steps, preferably 2-4 steps. The concentration of the dissolution liquid may be the same in all steps or varied, preferably the concentration of the dissolution liquid of the first dilution step is the closest to the concentration of the solvent in the filter reject.

If the filter reject is prone to gel, then it may be of interest to first perform a dissolution step with a dissolution liquid with a composition substantially the same as the solvent in the filter reject, and then one or more additional steps where dissolution is performed with a dissolution liquid having a higher concentration of the solvent than the solvent of the filter reject. As mentioned, a suitable solvent according to the present invention is sodium hydroxide.

Furthermore, according to yet another embodiment, the dilution of the filter reject by mixing with dissolution liquid is performed by adding dissolution liquid gradually, preferably in a continuous manner, such that the dissolution liquid is added to the filter reject and continuously dispersed into the filter reject, more preferably avoiding the presence of any large excess of low viscosity liquid in a mixing tank. A gradual dilution may be of interest to ensure that all liquid parts of the filter reject are evenly mixed with the dissolution liquid. Furthermore, with reference to equipment, such as the mentioned mixing tank, the present invention also refers to a system involving different operation units. This is further discussed below.

Moreover, the separation technology used is also of interest according to the present invention. According to one embodiment, the separation of inhomogeneities from the diluted reject stream involves centrifugation, filtration or sedimentation, or a combination thereof, preferably at least centrifugation. The optimal technology to use may also depend on other set parameters, such as the dissolution level or absolute viscosity etc. For instance, if the total liquid volume to separate is very large, then it may be of interest to apply sedimentation and not only centrifugation, as the latter would be quite expensive for such a flow level. In such a case sedimentation may be combined with other techniques. In line with this, according to one embodiment of the present invention, separating inhomogeneities from the diluted reject stream involves sedimentation and subsequent filtration. In this regard it should be mentioned that filtration may also be used in other combinations, such as together with centrifugation.

Furthermore, according to yet another embodiment, the step of separating inhomogeneities from the diluted reject stream provides a stream of purified dissolution liquid with dissolved cellulose and a low amount of inhomogeneities, preferably below 1 wt. % of the original mass of inhomogeneities, which stream of purified dissolution liquid with dissolved cellulose and a low amount of inhomogeneities preferably is recycled to a step of dissolving cellulose in an alkali solution, preferably being a spinning dope preparation process, more preferably the stream of purified dissolution liquid with dissolved cellulose and a low amount of inhomogeneities is recycled to said step of dissolving cellulose in an alkali solution. Moreover, according to another embodiment, the stream of purified dissolution liquid is mixed with another stream of dissolution liquid prior to being used for preparing cellulose spinning dope.

As hinted above, also other concentration levels may be of relevance in a spinning dope preparation process and thus in a method according to the present invention. One such is of course the cellulose concentration. According to one embodiment of the present invention, the cellulosic material in the alkali solution is a spinning dope composed of cellulose, cellulose carbamate, carboxylated cellulose, hydroxy-ethoxylated cellulose, cellulose xanthate, another derivative of cellulose, or a mixture of cellulose and cellulose derivatives, in the range of 4-12 wt. %, preferably 5-10 wt. %, calculated on the total weight of spinning dope. As suitable ranges for low derivatized pulp, then the concentration of cellulose is normally in the range of 6-12 wt. %, and with a non-derivatized cellulose pulp the comparative range is in the range of 5-8 wt. %.

Moreover, also additives may be used in a spinning dope preparation process, and may thus affect filtration and therefore also be of relevance according to the present invention. Therefore, according to one embodiment, the cellulose spinning dope composition comprises at least one additive for gelation prevention, said additive preferably comprising urea, thiourea, PEG or zinc, said additive more preferably being ZnO or $Zn(OH)_2$ added in a concentration range of 0.5-1.4 wt. % Zn calculated on the total weight of the cellulose spinning dope composition. Such additives and concentrations thereof will also be present in the dissolution liquid at a ratio, to the dominating alkaline compound of the solvent, that is approximately equal to said ratio in the solvent, in the spinning dope prepared and in the recycled filter reject. In relation to the above it may be mentioned that the additives above, ZnO or $Zn(OH)_2$, provide for a state as some form of sodium zincates, e.g. $Na_2Zn(OH)_4$, when present in the spinning dope.

Furthermore, also the combination of a certain spinning dope process and the filtration, dissolution, separation and recycling discussed above is of relevance according to the present invention. According to one embodiment of the present invention, the method is implemented in or connected to a spinning dope preparation process comprising a step of homogenizing the cellulosic material in an alkali solution and a subsequent step of dissolving cellulose in the alkali solution, preferably the homogenizing comprises mixing the cellulosic material in an alkali solution involving larger power density supplied to agitator(s) used than in the subsequent step of dissolving cellulose in the alkali solution, more preferably the temperature of the cellulosic material in the alkali solution is kept at maximum 0° C. during the step of homogenizing and during at least part of the step of dissolving cellulose in the alkali solution, most preferably the spinning dope preparation process involves a step of homogenizing and a step of dissolving cellulose in the alkali solution being performed continuously, to obtain a cellulose spinning dope composition. As may be understood from above, the method according to the present invention may be an integrated part of a spinning dope preparation process, and preferably where recycling of the dissolution liquid is utilized.

Also other steps may be included, such as a subsequent refining step, such as a refining step providing viscous dissipation and a temperature increase to the spinning dope composition by means of shearing. Furthermore, also the spinning dope preparation suitably is part of an entire fiber or film production process. In such a process, also coagulation, spinning and washing are included, and suitably also fiber crimping and possibly acid treatment.

As a continuation of the above, according to one embodiment, the spinning dope preparation process is followed by fiber spinning or film forming of the cellulose spinning dope composition in a coagulation bath, preferably a coagulation bath having a pH of more than 7.0, preferably a pH of at least 10, more preferably said coagulation bath comprising sodium carbonate or sodium sulfate, to produce a fiber tow, then passing the produced fiber tow through a sequence of consecutive stretching and washing steps, preferably in which the fiber tow is washed with washing liquid having gradually lower alkalinity.

Furthermore, also pre-treatment may be used. According to one embodiment, the cellulosic material in an alkali solution is pre-treated prior to the step of homogenizing by derivatizing, hydrolysis, enzymatic treatment and/or mechanical treatment. Moreover, according to yet another embodiment, the cellulosic material in an alkali solution is pre-treated prior to the step of homogenizing by shortening the chains of cellulose polymers by cleavage of cellulose chains, preferably random cleavage of cellulose chains.

The present invention also refers to an apparatus, or system, comprising:
  a dissolution unit arranged for dissolving cellulose in an alkali solution;
  a filter unit arranged for filtering the dissolved cellulose, thereby forming a filtered dissolved cellulose solution and a filter reject;

a mixer unit arranged for mixing the filter reject, said filter reject having a first viscosity value, with a dissolution liquid having a second viscosity value, wherein the second viscosity value is lower than the first viscosity value, to provide a diluted reject stream having a third viscosity value being lower than the first viscosity value of the filter reject; and a separator unit arranged to provide separation of inhomogeneities from the diluted reject stream, to provide a stream of purified dissolution liquid with dissolved cellulose and a low amount of inhomogeneities and a stream concentrated in inhomogeneities.

According to one embodiment, the apparatus is part of or connected to a spinning dope preparation system.

According to another embodiment, the separator unit comprises at least a centrifuge. As hinted above, the system may also comprise one or more sedimentation tanks and one or more filters. Different separator units are possible to use in combination.

Moreover, according to one embodiment of the present invention, the apparatus or system also comprises a recirculation line provided to recirculate the stream of purified dissolution liquid with dissolved cellulose and a low amount of inhomogeneities from the separator unit to a cellulose dissolution unit, preferably to a spinning dope preparation unit, more preferably to said dissolution unit arranged for dissolving cellulose in an alkali solution.

Furthermore, according to yet another embodiment, the mixer unit is arranged to enable dilution of the filter reject by mixing with dissolution liquid in multiple steps.

Furthermore, the filter reject can be separated from the filtrate in various ways, depending on the filtration device applied. Some filters are continuously cleaned by backflushing with a small amount of filtrate solution, in which case the filter reject can be diluted as described above. In other filtration devices, the reject may accumulate on the filter material until it is too clogged and must be cleaned. For such filters, the dilution of the filter reject by dissolution liquid could be realized by backflushing and/or washing with the dissolution liquid, cleaning the filter in the process. Furthermore, the dissolution liquid used for backflushing and cleaning the filter could be used several times with separation of the particles, for example by centrifugation, between each cycle of cleaning use, such as a backflush passage through the filter.

DETAILED DESCRIPTION OF THE DRAWINGS

In FIG. 1 there is shown a fiber production process, from pulp to an end fiber product. Firstly, pulping and related process steps are performed. Such process may involve adaptation and pulp washing and cooling. Secondly, a spinning dope is prepared. As mentioned above, the spinning dope preparation may involve homogenization and dissolution. Furthermore, also related process steps are involved here. One such is the spinning dope filtration, which directly relates to the process according to the present invention, as described above and below. Moreover, also spinning dope deaeration is suitably involved in the overall process. Furthermore, also chemical recovery is suitably performed in relation to the spinning dope preparation and/or related steps, where also part of the chemical recovery preferably is performed also by use of the process according to the present invention (see further explanation below). Subsequently, fiber spinning is performed. Then, the produced fiber tow is washed. This may be an integrated process with the actual spinning process. As shown in FIG. 1, suitable steps thereafter are fiber tow drying, crimping, and cutting of the produced fiber. Finally, baling is made of the produced fiber.

Figures 2, 3:
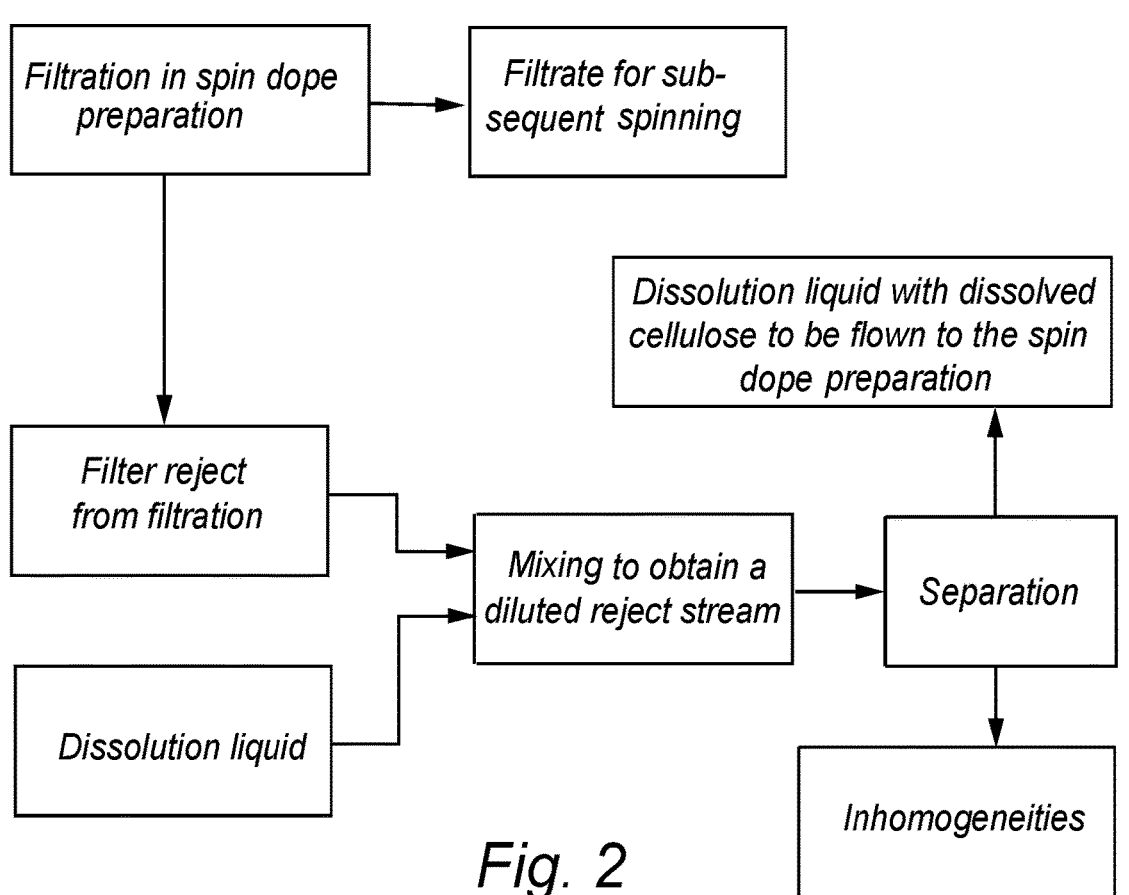
In FIG. 2 there is shown a process according to one embodiment of the present invention.
FIGS. 3-8 show results linked to trials and examples discussed below.

In FIG. 2 there is shown a process according to one embodiment of the present invention. From a spinning dope filtration step, such as mentioned above, the filtrate obtained is sent to the spinning step and the filter reject obtained is processed in accordance with the present invention. The filter reject comprising cellulose, solvent and inhomogeneities, is firstly mixed with a dissolution liquid, suitably based on the same type of solvent as in the filter reject, preferably an aqueous sodium hydroxide solution, which dissolution liquid has a lower viscosity than the filter reject. Different types of mixers, both such suitable for continuous systems and such for batch or semi-batch systems, may be used in this step. Examples are a CSTR (continuously stirred tank reactor) or a static mixer reactor. The combined mixture is a diluted reject stream, which is then flown to a separation step, such as centrifugation or filtration and/or sedimentation. Inhomogeneities, such as particles and/or aggregates or the like, are then separated off from the diluted reject stream. The mixing or dilution step is necessary to be able to separate off inhomogeneities in an efficient way. After this separation step, the obtained stream of dissolution liquid with dissolved cellulose and a low amount of inhomogeneities, preferably below 1 wt. % of the original mass of inhomogeneities, is then recycled to the spinning dope preparation process, suitably to a dissolution step of the spinning dope preparation process.

EXAMPLES

With reference to the present invention, the idea is directed to reduce the solution viscosity by diluting the filter reject with fresh recycled solvent (~ for instance 9 wt. % NaOH and 1 wt. % ZnO), then separate the particles by filtration or sedimentation, before dissolving new pulp in the mixture obtained. This implies that the filter reject free from particles and other inhomogeneities is then included in the new solution.

In a first set of trials (example 1, see table 1/FIG. 3) the following was applied:

Dissolution of 6.5 wt. % IV-290 pretreated BE-pulp gave a clogging value of 4500, which should be a decent representation of a filter reject.

Dilutions in solvent (9 wt. % NaOH, 1 wt. % ZnO) to 5, 10 and 23 wt. % of this nonfilterable solution were prepared. These dilutions were obviously full of particles giving them significant opacity.

Filtration of the 5% dilution was performed with a 5μ filter. It was not successful.

However, centrifugation (8 min, 3000 RPM, Hemel PLC-322, 150 mm outer radius of rotation) made the particles sediment as a tiny lump at the bottom for all 3 dilutions. The lump volume corresponded to less than 10% of the "filter reject" diluted, judging by ocular inspection.

The centrifuged liquid was clear and ran easily through the 5μ filter (only the 5% dilution was tested in filtration, but all 3 liquids were clear)

Dissolution of new pulp (pretreated Enocell) was dissolved in the centrifuged solvents with diluted solution (5, 10 and 23 wt. %) and compared to a reference dissolution.

Results

The clogging value was not affected by 5% of filter reject diluted into the solvent prior to the dissolution of new cellulose pulp Even for the 10% and 23% samples the increased clogging value relative to the reference was small (in particular, given that the actual cellulose concentration was higher than in the reference)

Centrifugation appears to be the best separation technique due to the large number of particles in filter reject. Filtration would require a cake-filtration function, which might be difficult with soft gel particles. Centrifugation removes essentially all particles at the viscosities achieved.

Results are presented in table 1 (FIG. 3).

Conclusions from Example 1

The concept seems to work very well, with centrifugation.

Even the lowest concentration of 5% filter reject is probably several times higher than there would be in an industrial process.

The possibility to perform the separation at high concentration means that only part of the solvent stream must pass the mixing tank and centrifuge, before later being mixed with the remaining solvent.

The possibility to dissolve cellulose even with 10% solution diluted in the solvent, can be utilized to handle problems in the filtration by accepting a larger amount of reject, while maintaining the overall process yield.

Example 2

Cellulose of IV 210 was dissolved in NaOH—ZnO aqueous solvent to generate a solution containing 7.5 wt. % NaOH, 7.5 wt. % cellulose and 0.95 wt. % ZnO. It was a relatively bad solution, generally not feasible for spinning unless very extensive filtration is applied. It represents a filter reject that has a lower than typical concentration of particles. However, with the method here generated, it is generally not the amount of particles that is challenging to the separation. All particles of a given size and density will sediment at equal rates during centrifugation or sedimentation. This example was intended to investigate and show the effect of dilution on the viscosity of the bulk liquid and the effect of said viscosity on the separation of particles. The solution prepared was then diluted, with a dissolution liquid containing 9 wt. % NaOH and 1.15 wt. % ZnO, by the dilution factors: 1.25, 2, 3, 4, 5, 10, and 20, which gave the cellulose concentrations: 6, 3.75, 2.5, 1.87, 1.5, 0.75, and 0.375 wt. %, in NaOH and ZnO concentrations ranging between 7.5 and 9 wt. % and 0.95 and 1.15 wt. % in a way that is obvious and easily calculated from the above description. Samples of these diluted solutions and of the original 7.5 wt. % cellulose solution were then centrifuged with either 1000 RPM or 3000 RPM for 2 min and then measured for optical transmittance of the wavelength of 500 nm, to evaluate the occurrence of residual particles after centrifugation. Before the measurement, all solutions were diluted to reach the same total dilution factor and cellulose concentration, to make them comparable in terms of the efficiency of particle separation during the previous centrifugation step. At a dilution factor of 2 (3.75 wt. % cellulose) most of the particles had been removed for both centrifugation speeds and at dilution factor 3 or 4 (2.5 or 1.87 wt. % cellulose) the transmittance was no less than for the higher dilution factors.

Figure 4:
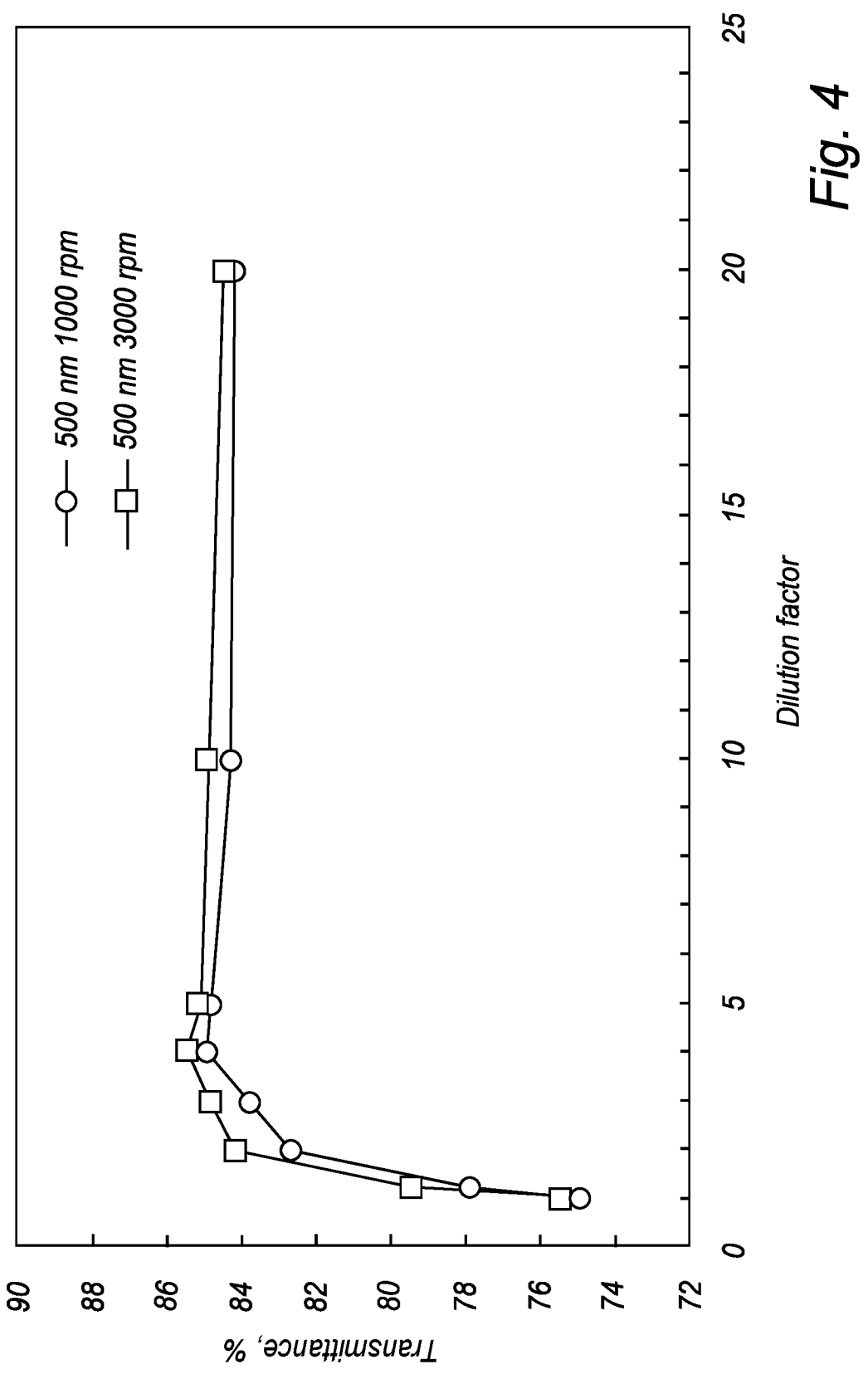

Comparison of the transmittance at 500 nm of the supernatant after centrifugation at 1000 rpm and 3000 rpm of solutions in 9 wt. % NaOH and adjustment of the concentration to that at the dilution factor of 20 are shown in FIG. 4.

Also the viscosity (during continuous shear at 10 s$^{-1}$ and T=5° C., with a cup-bobbin device) was measured for these diluted solutions and for the original 7.5 wt. % cellulose solution. The viscosity reduces quickly with increasing dilution factor in the range 1-5. This range corresponds to where the solution transitions from an entangled solution to the "dilute" or non-entangled range.

Figure 5:
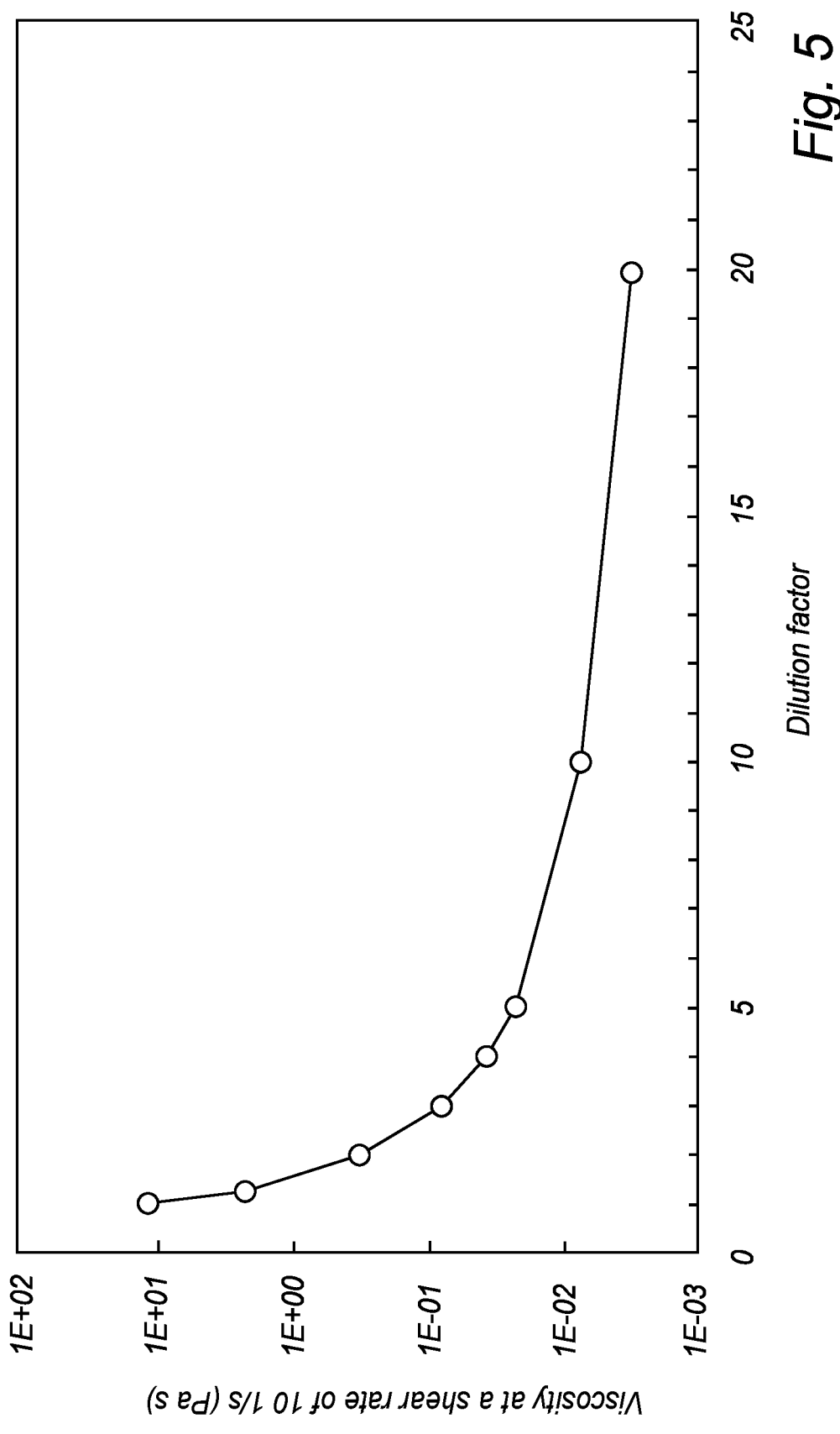

In FIG. 5 there is shown the rheology of solutions diluted in 9 wt. % NaOH, 1.15 wt. % ZnO.

Figure 6:
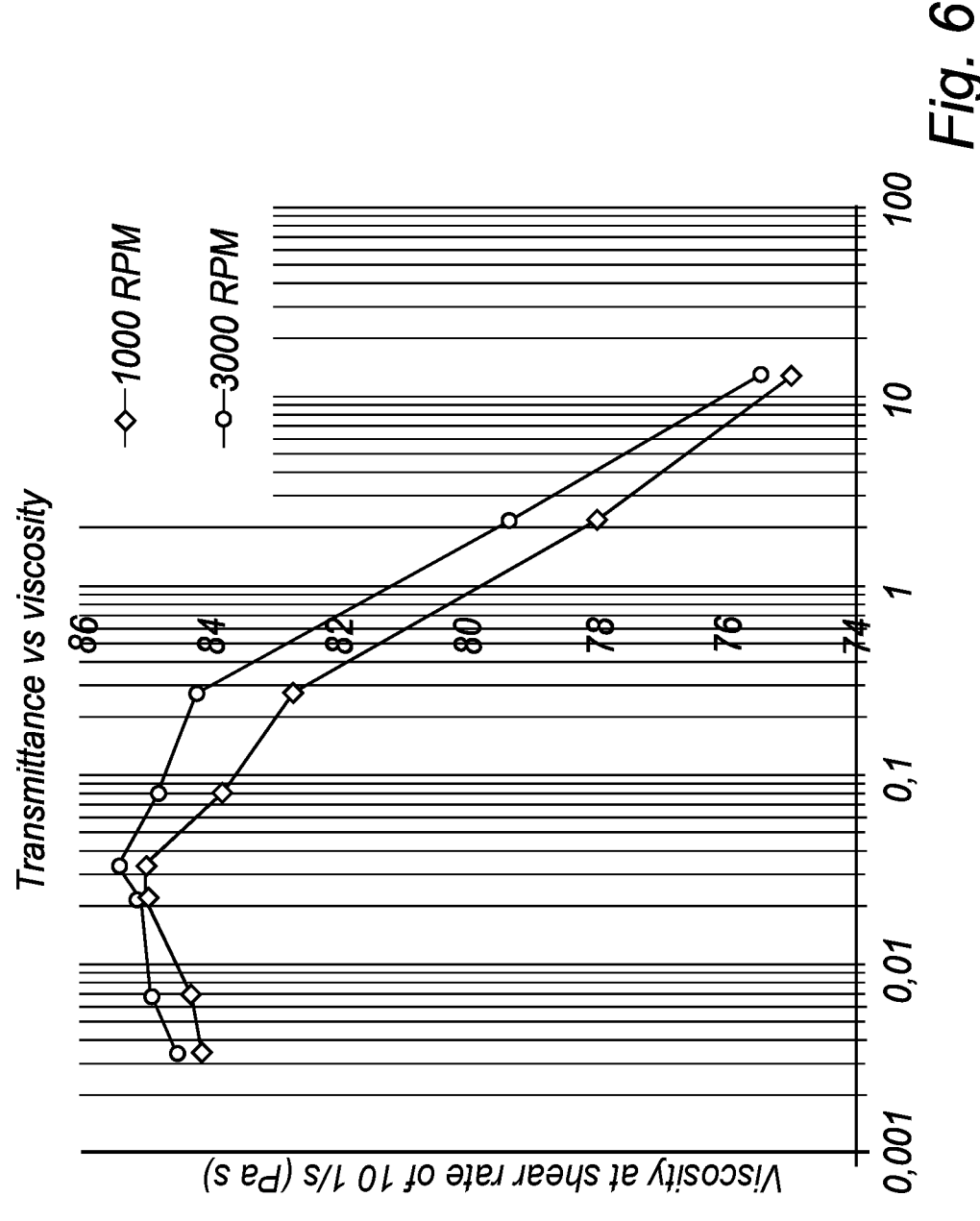

Moreover, if the transmittance is plotted with the viscosity on the x-axis, another central feature is highlighted (see FIG. 6). From a range of 0.1-0.5 Pas (as measured during continuous shear at 10 s$^{-1}$ and T=5° C., with a cup-bobbin device), it starts to become, and below 0.1 Pas it is, simple to centrifuge the particles away from these solutions.

Example 3

Cellulose of IV 210 was dissolved in NaOH—ZnO aqueous solvent to generate a solution containing 7.5 wt. % NaOH, 7.5 wt. % cellulose and 0.95 wt. % ZnO. It was a relatively bad solution, generally not feasible for spinning unless very extensive filtration is applied. It represents a filter reject that has a lower than typical concentration of particles. However, with the method here generated, it is generally not the amount of particles that is challenging to the separation. All particles of a given size and density will sediment at equal rates during centrifugation or sedimentation. This example was intended to investigate and show the effect of the concentration of the dissolution liquid on the potential generation of new particles, which were not present in the original reject, but generated during the dilution into a solvent that is not in the optimal range. It is generally of interest to use solvent concentrations higher than in the final solution, i.e. higher than the optimal solvent composition, because the water present in wet pulp reduces the concentration and must be compensated for. Thus the solution prepared was then diluted, with a range of dissolution liquids containing 9, 10, 11, 12, or 14 wt. % NaOH and 1.15, 1.27, 1.41, 1.53, or 1.79 wt. % ZnO, by the dilution factor 5, which gave the cellulose concentration 1.5 wt. %, in the following NaOH and ZnO concentrations: 8.7, 9.5, 10.3, 11.1, or 12.7 wt. % NaOH and 1.11, 1.21, 1.31, 1.42, or 1.62 wt. % ZnO. Samples of these diluted solutions were then centrifuged with 3000 RPM for 2 min and then measured for optical transmittance of the wavelength of 500 nm, to evaluate the occurrence of residual particles after centrifugation. As all solutions were diluted to the same total dilution factor of 5 and cellulose concentration of 1.5 wt. %, no further dilution was needed to make them comparable in terms of the presence of particles. At the highest concentration of the dissolution liquid there was apparent occurrence of phase separation and consequently lower transmittance, also after centrifugation. But for the lower concentrations, 12-9 wt. %, no such tendencies could be observed.

In another test the use of a solution and filter reject with lower cellulose concentration was evaluated. Then the same cellulose solution was first diluted in 7.5 wt. % NaOH and 0.95 wt. % ZnO to a cellulose concentration of 6 wt. %, before the same dilution procedure as described above, with different dissolution liquid concentrations, was applied. The transmittance for the 14 wt. % NaOH sample was then a little bit higher, which indicates a little bit less formation of particles. However, the upper limit for the NaOH concentration in the dissolution liquid for this type of solution was confirmed to be somewhere in the range 12-14 wt. %.

Figure 7:
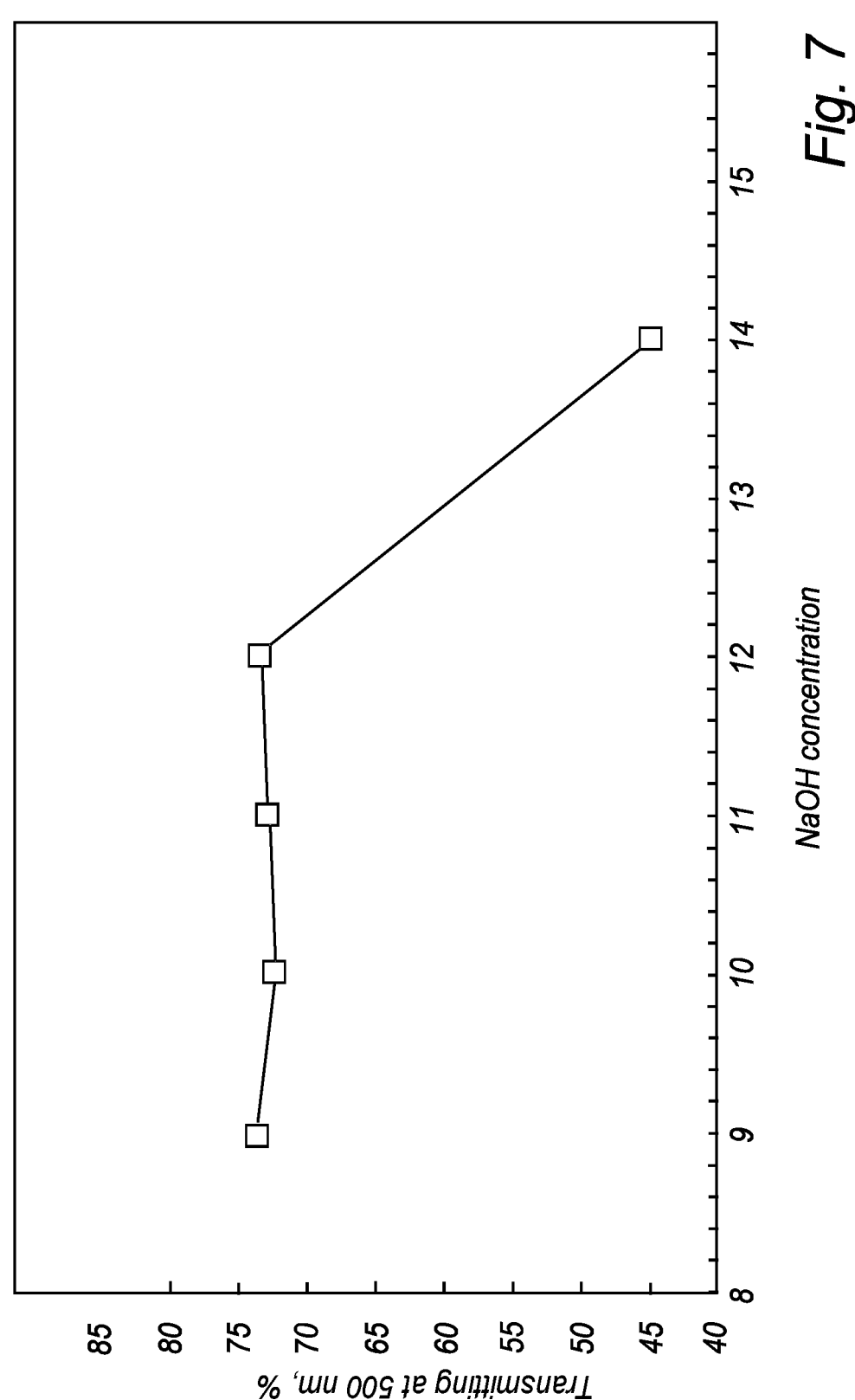

In FIG. 7 there is shown a comparison of the transmittance at 500 nm of the supernatant before and after centrifugation at 3000 rpm of 7.5 wt. % solutions in 9-14 wt. % NaOH at the dilution factor of 5.

Figure 8:
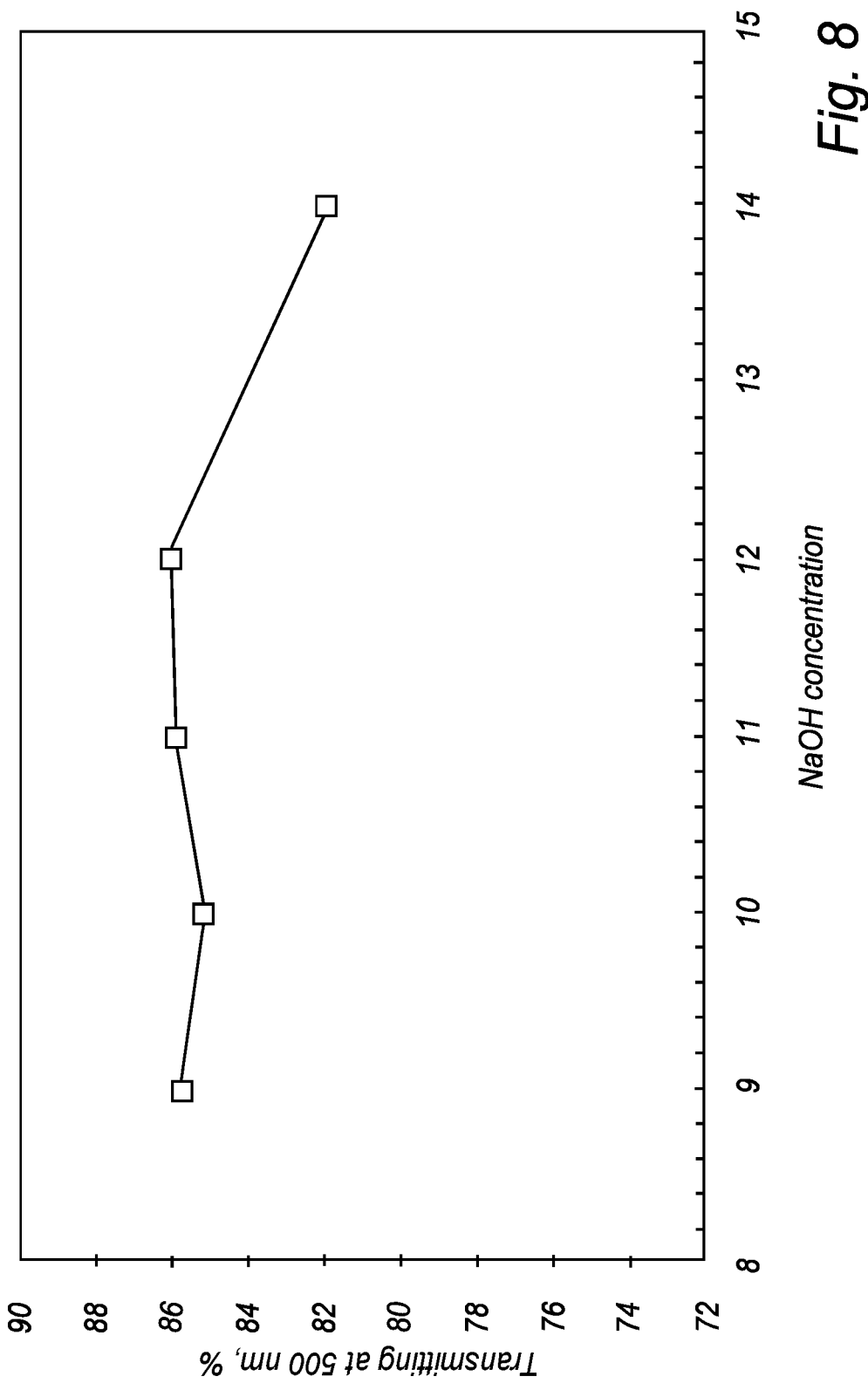

Moreover, in FIG. 8 there is disclosed a comparison of the transmittance at 500 nm of the supernatant before and after centrifugation at 3000 rpm of 6.0 wt. % solutions in 9-14 wt. % NaOH at the dilution factor of 5.

The invention claimed is:

1. A method of dissolving cellulose, said method comprising:
   dissolving cellulose in an alkali solution;
   filtering the dissolved cellulose, thereby forming a filtered dissolved cellulose solution and a filter reject;
   mixing said filter reject having a first viscosity value with a dissolution liquid having a second viscosity value, wherein the second viscosity value is lower than the first viscosity value, to provide a diluted reject stream having a third viscosity value being lower than the first viscosity value of the filter reject; and
   separating inhomogeneities from the diluted reject stream.

2. The method according to claim 1,
   wherein the cellulose concentration in the solution formed by the alkali solution, preferably being a first alkali dissolution liquid, after dissolving the cellulose therein is at least 4 wt. %, calculated on the total weight, and/or
   wherein the solubility of the cellulose in the solution formed by the alkali solution, preferably being a first alkali dissolution liquid, is kept at at least 95%.

3. The method according to claim 1,
   wherein the alkali solution is a first alkali dissolution liquid, and wherein the dissolution liquid is a second alkali dissolution liquid, and/or
   wherein the dissolution liquid is an alkaline aqueous solvent solution, and/or wherein the dissolution liquid has substantially the same composition with reference to main salt components of the filter reject, but which dissolution liquid is concentrated relative to the water content by a factor ranging from 0.9-1.8.

4. The method according to claim 1,
   wherein the method is implemented in or connected to a spinning dope preparation process, and/or
   wherein the method is implemented in or connected to a spinning dope preparation process comprising a step of homogenizing the cellulosic material in an alkali solution and a subsequent step of dissolving cellulose in the alkali solution to obtain a cellulose spinning dope composition.

5. The method according to claim 1, wherein the inhomogeneities comprise any of particles, aggregates, solid components, or impurities, and/or other insoluble material.

6. The method according to claim 1,
   wherein the second viscosity value of the dissolution liquid is at least 10 times lower than the first viscosity value of the filter reject, and/or
   wherein the second viscosity value of the dissolution liquid is at least 10 times lower than the first viscosity value of the filter reject, and wherein the filter reject is an aqueous sodium hydroxide solution with a sodium hydroxide concentration of at least 5 wt. %, calculated on the total weight of the filter reject, and wherein the second alkali dissolution liquid is an aqueous sodium hydroxide solution with a sodium hydroxide concentration of at least 5 wt. %, and/or

wherein the third viscosity value of the diluted reject stream is at least 2 times lower than the first viscosity value of the filter reject, and/or
   wherein the third viscosity value of the diluted reject stream is maximum 500 mPa*s.

7. The method according to claim 1,
   wherein the step of separating inhomogeneities from the diluted reject stream provides a stream of purified dissolution liquid with dissolved cellulose, which stream of purified dissolution liquid with dissolved cellulose is recycled to a step of dissolving cellulose, and/or
   wherein the step of separating inhomogeneities from the diluted reject stream provides a stream of purified dissolution liquid with dissolved cellulose which is used in a spin dope preparation step for dissolving cellulose.

8. The method according to claim 1, wherein temperatures of the filter reject and the dissolution liquid are kept at temperatures below 30° C., and/or wherein the diluted reject stream is kept at a temperature below 30° C.

9. The method according to claim 1,
   wherein the filter reject is an aqueous sodium hydroxide solution with a sodium hydroxide concentration of at least 5 wt. %, and/or wherein the dissolution liquid is an aqueous sodium hydroxide solution with a sodium hydroxide concentration of at least 5 wt. %, and/or
   wherein the filter reject is an aqueous sodium hydroxide solution with a sodium hydroxide concentration of at least 5 wt. %, calculated on the total weight of the filter reject, and wherein the dissolution liquid, is an aqueous sodium hydroxide solution with a sodium hydroxide concentration of at least 5 wt. %.

10. The method according to claim 1,
    wherein the mixing of said filter reject with the dissolution liquid involves a total dilution of the filter reject by at least a factor 2, with respect to the cellulose content, and/or
    wherein the dilution of the filter reject by mixing with dissolution liquid is performed in at least two steps.

11. The method according to claim 1, wherein the dilution of the filter reject by mixing with dissolution liquid is performed by adding dissolution liquid gradually, preferably in a continuous manner, such that the dissolution liquid is added to the filter reject and continuously dispersed into the filter reject.

12. The method according to claim 1,
    wherein the step of separating inhomogeneities from the diluted reject stream involves centrifugation, filtration or sedimentation, or a combination thereof, and/or
    wherein the step of separating inhomogeneities from the diluted reject stream involves sedimentation and subsequent filtration.

13. The method according to claim 1, wherein the step of separating inhomogeneities from the diluted reject stream provides a stream of purified dissolution liquid with dissolved cellulose and a low amount of inhomogeneities.

14. The method according to claim 1, wherein the stream of purified dissolution liquid is mixed with another stream of dissolution liquid prior to being used for preparing cellulose spinning dope.

15. The method according to claim 1,
    wherein the cellulosic material in the alkali solution is spinning dope composed of cellulose, cellulose carbamate, carboxylated cellulose, hydroxy-ethoxylated cellulose, cellulose xanthate, another derivative of cellulose, or a mixture of cellulose and cellulose derivatives, in the range of 4-12 wt. %, calculated on the total weight of spinning dope, and/or wherein the cellulose spinning dope composition comprises at least one additive for gelation prevention, said additive preferably comprising urea, thiourea, PEG or zinc, and/or wherein the cellulose spinning dope composition comprises an being ZnO or $Zn(OH)_2$ added in a concentration range of 0.5-1.4 wt. % Zn calculated on the total weight of the cellulose spinning dope composition.

16. The method according to claim 4, wherein the spinning dope preparation process is followed by fiber spinning or film forming of the cellulose spinning dope composition in a coagulation bath, having a pH of more than 7.0 to produce a fiber tow, then passing the produced fiber tow through a sequence of consecutive stretching and washing steps, in which the fiber tow is washed with washing liquid having gradually lower alkalinity, and/or wherein the cellulosic material in an alkali solution is pre-treated prior to the step of homogenizing by derivatizing, hydrolysis, enzymatic treatment and/or mechanical treatment, and/or wherein the cellulosic material in an alkali solution is pre-treated prior to the step of homogenizing by shortening the chains of cellulose polymers by cleavage of cellulose chains.

17. The method according to claim 1, wherein the cellulose concentration in the solution formed by the alkali solution, being a first alkali dissolution liquid, after dissolving the cellulose therein is in a range of 4-12 wt. %, and/or wherein the solubility of the cellulose in the solution formed by the alkali solution, being a first alkali dissolution liquid, is kept at at least 95%.

18. The method according to claim 1, wherein the alkali solution is a first alkali dissolution liquid, and wherein the dissolution liquid is a second alkali dissolution liquid, and/or wherein the dissolution liquid is an alkaline aqueous sodium hydroxide solution, wherein the alkali solution is a first alkali dissolution liquid and the dissolution liquid is a second alkali dissolution liquid, and/or wherein the dissolution liquid is a second alkali dissolution liquid, and has substantially the same composition with reference to main salt components of the filter reject, but which dissolution liquid is concentrated relative to the water content by a factor ranging from 0.9-1.8.

19. The method according to claim 1, wherein the filter reject is an aqueous sodium hydroxide solution with a sodium hydroxide concentration of 7-9 wt. %.

20. The method according to claim 1, wherein the step of separating inhomogeneities from the diluted reject stream provides a stream of purified dissolution liquid with dissolved cellulose and a low amount of inhomogeneities, which stream of purified dissolution liquid with dissolved cellulose and a low amount of inhomogeneities is recycled to a step of dissolving cellulose in an alkali solution, wherein the stream of purified dissolution liquid with dissolved cellulose and a low amount of inhomogeneities is recycled to said step of dissolving cellulose in an alkali solution.

* * * * *